United States Patent
Natsumeda et al.

(10) Patent No.: US 6,782,385 B2
(45) Date of Patent: Aug. 24, 2004

(54) METHOD AND SYSTEM FOR PROVIDING PERFORMANCE INDEX INFORMATION OF A MACHINE ELEMENT, AND METHOD AND SYSTEM FOR SUPPORTING SELECTION OF A MACHINE ELEMENT

(75) Inventors: Shinichi Natsumeda, Kanagawa (JP); Hirotoshi Aramaki, Kanagawa (JP); Yoshio Shoda, Kanagawa (JP)

(73) Assignee: NSK Ltd., Tokyo (JP)

( * ) Notice: Subject to any disclaimer, the term of this patent is extended or adjusted under 35 U.S.C. 154(b) by 215 days.

(21) Appl. No.: 09/969,580

(22) Filed: Oct. 4, 2001

(65) Prior Publication Data

US 2002/0059229 A1 May 16, 2002

(30) Foreign Application Priority Data

Oct. 4, 2000 (JP) ..................................... P. 2000-305216

(51) Int. Cl.$^7$ ............................................. G06F 17/30
(52) U.S. Cl. ................................... 707/6; 707/1; 707/5
(58) Field of Search ............................. 707/1, 2, 5, 6, 707/10, 100, 102, 104.1; 702/118

(56) References Cited

U.S. PATENT DOCUMENTS

| | | | |
|---|---|---|---|
| 5,091,852 A | * | 2/1992 | Tsuchida et al. ................ 707/2 |
| 5,331,579 A | | 7/1994 | Maguire, Jr. et al. |
| 5,717,598 A | | 2/1998 | Miyakawa et al. |
| 6,405,187 B1 | * | 6/2002 | Egan et al. ...................... 707/2 |
| 2002/0046002 A1 | * | 4/2002 | Tang et al. .................. 702/182 |

FOREIGN PATENT DOCUMENTS

JP  2000-20557 A  1/2000

OTHER PUBLICATIONS

SKF Interactive Catalogue; "Calculations" (http://www.skf-.com) (no date).
FAG Electric Catalogue (CD–ROM: Rolling Bearings Version1.1©2000).
NTN Technical calculation program (http://www.ntn.co.jp/japan/index.html) (no date).
NSK Bearing Pro (CD–ROM: An Electronic Guide to NSK Products Version.1.21©1998).
NSK Rolling Bearing General Catalog (CAT. No. 1101C), 1996, pp. A24–A27.
Hiromichi Takemura, et al., SAE Technical paper Series 2000–01–2601, "Development of a New Life Equation for Ball arid Roller Bearings", pp. 1–7.
T.A. Haris, "Rolling Bearing Analysis" ($3^{rd}$ edition) John Wiley & Sons, 1991, pp. 504–510.
Practical Handbook of Rolling Bearings, Kogyo Chosakai, 1996, p. 278.
H. Aramaki, NSK Technical Journal, Rolling Bearing Analysis Program Package "BRAIN", No. 663, 1997, pp. 1–7.
Hirotoshi Aramaki, et al., SAE Technical Paper 970586, Rolling Bearing Analysis Codes "BRAIN"—The Estimation of Rolling Bearing Performance for an Automotive Application, pp. 181–201, 1997.
James M. Vaccaro, et al; R&M Software tools: CA Confernce Article, Combined Proceedings of the 1990 and 1991 Leesburg Workshops on Reliability and Maintainability Computer–Aided Engineering in Concurrent Engineering; Oct. 9, 1990; pp. 83–91.

* cited by examiner

Primary Examiner—Charles Rones
Assistant Examiner—Neveen Abel-Jalil
(74) Attorney, Agent, or Firm—Sughrue Mion, PLLC

(57) ABSTRACT

When an information provision program is implemented, an input screen is displayed on a display section (step 101). A specific designation number is input (step 103), and one or plural bearing performance indexes are selected (step 107). When bearing performance indexes are selected, bearing service conditions which are required depending on the bearing performance indexes are input. Then, performance calculation programs corresponding to selected bearing performances are activated (steps 110-1, 110-2, . . .), and obtained calculation results are simultaneously displayed.

13 Claims, 10 Drawing Sheets

DIGITAL BEARING

BEARING DESIGNATION NUMBER
[ ] SELECTION FROM CATALOGUE — 16

PERFORMANCE CALCULATION MENU — 11
- ☐ FATIGUE LIFE   ○ ISO   ○ NSK ABLE FORECASTER   ☐ GREASE LIFE
- ☐ TORQUE   ☐ BEARING TEMPERATURE   ☐ NECESSARY MINIMUM LOAD   ☐ DISPLACEMENT   ☐ ALLOWABLE AXIAL LOAD

[ CALCULATION ] — 12    [ CANCEL ] — 13

SERVICE CONDITIONS — 14
- RADIAL LOAD [    ] N        ROTATION NUMBER [    ] rev/min
- AXIAL LOAD [    ] N         AMBIENT TEMPERATURE [    ] °C
- LUBRICATION METHOD ☐ GREASE   ○ FORCED CIRCULATION OIL SUPPLY
  ☐ OIL   ○ BATH
- OIL VISCOSITY [    ] mm2/s@40°C       [    ] cc/min
- OPERATION (OIL SUPPLY) TEMPERATURE [    ] °C    [    ] mm2/s@100°C
- CONTAMINATION DEGREE [ ORDINARY(ac=0.5) ▼ ]

| DIGITAL BEARING | ☒ |

BEARING DESIGNATION NUMBER

CALCULATION RESULTS

FATIGUE LIFE = [ ] hrs.

GREASE LIFE = [ ] hrs.

TORQUE = [ ] Nm

BEARING TEMPERATURE = [ ] °C

NECESSARY MINIMUM LOAD = [ ] N

RADIAL DISPLACEMENT = [ ] μm

AXIAL DISPLACEMENT = [ ] μm

ALLOWABLE AXIAL LOAD = [ ] N

[ RECALCULATION ]  [ END ]

FIG.5

| ITEMS OF PERFORMANCE INDEX CALCULATION | SERVICE CONDITIONS NECESSARY FOR CALCULATION OF BEARING PERFORMANCE INDEX | | | | | | | | |
|---|---|---|---|---|---|---|---|---|---|
| | BEARING DESIGNATION NUMBER | RADIAL LOAD | AXIAL LOAD | ROTATION NUMBER | AMBIENT TEMPERATURE | LUBRICATION METHOD | VISCOSITY OF LUBRICATING OIL OR GREASE | OPERATING | CONTAMINATION DEGREE |
| FATIGUE LIFE | ○ | ○ | | ○ | | | ○ | ○ | ○ |
| DYNAMIC TORQUE | ○ | ○ | ○ | ○ | | ○ | ○ | ○ | |
| BEARING TEMPERATURE | ○ | ○ | ○ | ○ | ○ | ○ | ○ | ○ | |
| NECESSARY MINIMUM LOAD | ○ | ○ | | | | | | | |
| RADIAL DISPLACEMENT | ○ | ○ | | | | | | | |
| ALLOWABLE AXIAL LOAD | ○ | | | ○ | | | | | |

FIG.6

| FUNCTIONS OF BEARING | CALCULATION EXPRESSION | REMARKS |
|---|---|---|
| FATIGUE LIFE | ISO CALCULATION EXPRESSION $$L = \frac{10^6}{60n} a_1 a_2 a_3 \left(\frac{C_r}{F_r}\right)^p$$ | |
| | NEW LIFE CALCULATION EXPRESSION $$L = \frac{10^6}{60n} a_1 a_{NSK} \left(\frac{C_r}{F_r}\right)^p$$ | $a_{NSK}$ DEPENDS ON CONTAMINATION DEGREE COEFFICIENT $a_c$, AND LUBRICATION COEFFICIENT k |
| DYNAMIC TORQUE*1 | EXPRESSION OF PALGMREN $M = M_l + M_\nu + M_f$ WHERE $M_l = f_1 F_r d_m$ $M_\nu = \begin{cases} 10^{-7} f_\nu (\nu_0 n)^{2/3} d_m^3 & \text{WHEN } \nu_0 n \geq 2000 \\ 160 \times 10^{-7} f_\nu d_m^3 & \text{WHEN } \nu_0 n \leq 2000 \end{cases}$ $M_f = f_f F_a d_m$ | $f_1, f_\nu,$ AND $f_f$ DEPEND ON BEARING DESIGNATION NUMBER AND LUBRICATION METHOD |
| BEARING TEMPERATURE | SEE FLOW OF FIG.7 | |
| NECESSARY MINIMUM LOAD*1 | $F_{rm} = 0.02 C_r$ (BEARING WITH RETAINER) $F_{rm} = 0.04 C_r$ (FULL ROLLER BEARING) | |
| RADIAL DISPLACEMENT | $\delta_r = 7.68 \times 10^{-5} \frac{Q_{max}^{0.9}}{\iota^{0.8}}$ WHERE $Q_{max} = \frac{5 F_r}{Z}$ | |
| ALLOWABLE AXIAL LOAD | $C_A = \begin{cases} 9.8 f \left\{\frac{900(k \cdot d)^2}{n+1500} - 0.023 \times (k \cdot d)^{2.5}\right\} & \text{GREASE LUBRICATION} \\ 9.8 f \left\{\frac{490(k \cdot d)^2}{n+1000} - 0.000135 \times (k \cdot d)^{3.4}\right\} & \text{OIL LUBRICATION} \end{cases}$ | f DEPENDS ON LOAD CONDITION, AND k DEPENDS ON BEARING DESIGNATION NUMBER |

DIGITAL BEARING

KIND: DEEP GROOVE BALL BEARING ▼ — 31

DIMENSIONAL RESTRICTION — 32
- ☐ INNER DIAMETER [ ] ~ [ ] mm
- ☐ OUTER DIAMETER [ ] ~ [ ] mm
- ☐ WIDTH [ ] ~ [ ] mm

SERVICE CONDITIONS — 33
- RADIAL LOAD [ ] N
- AXIAL LOAD [ ] N
- LUBRICATION METHOD: ☐ GREASE  ☐ OIL ○ BATH ○ FORCED CIRCULATION OIL SUPPLY
- OIL VISCOSITY [ ] mm2/s@40°C  [ ] cc/min
- OPERATION (OIL SUPPLY) TEMPERATURE [ ] °C
- ROTATION NUMBER [ ] rev/min
- AMBIENT TEMPERATURE [ ] °C
- CONTAMINATION DEGREE: ORDINARY(ac=0.5) ▼ [ ] mm2/s@100°C

REQUIRED SPECIFICATION — 34
- ☐ FATIGUE LIFE [ ] hrs.
- ☐ TORQUE [ ] Nm
- ☐ BEARING TEMPERATURE [ ] °C
- ☐ RADIAL DISPLACEMENT [ ] μm
- ☐ AXIAL DISPLACEMENT [ ] μm

[ START SEARCH ]   [ CANCEL ]

METHOD AND SYSTEM FOR PROVIDING PERFORMANCE INDEX INFORMATION OF A MACHINE ELEMENT, AND METHOD AND SYSTEM FOR SUPPORTING SELECTION OF A MACHINE ELEMENT

BACKGROUND OF THE INVENTION

1. Field of the Invention

The present invention relates to a method and system for providing performance index information of a machine element which predict and output the performance index value of the machine element, particularly, a rolling bearing (hereinafter, referred to merely as "bearing") by using a computer, and also to a method and system for supporting selection of a machine element.

2. Description of the Related Art

In order to attain limit design or optimum design of a mechanical apparatus, it is necessary to know the performance of each of machine elements used in the mechanical apparatus. For example, indexes indicating the performance of a bearing include the fatigue life, the grease life, the torque, the bearing temperature, the allowable axial load, etc. In a design of the mechanical apparatus, usually, it is required to consider plural performance indexes. It is known that such performance indexes are predictively calculated by respective predetermined calculation expressions on the basis of dimension and other element value data of the bearing, and a service condition data. Computer software applications for the calculation have been provided.

Conventionally, in order to obtain performance index values of a machine element in accordance with a design condition of a mechanical apparatus, the designer is requested to respectively activate required prediction calculation software applications for respective performance indexes, and hence cannot simultaneously obtain plural performance indexes.

When a machine element which satisfies allowable values of plural performance indexes is to be selected, designation number of machine element must be first selected, performance index values must be individually calculated, and the calculated values must be judged whether they satisfy the allowable values or not.

SUMMARY OF THE INVENTION

It is an object of the invention to provide a method and system for providing performance index information of a machine element which can simultaneously obtain plural index values indicating the performance of the machine element.

It is another object of the invention to provide a method and system for supporting selection of a machine element which can rapidly select a machine element satisfying allowable values of plural performance indexes.

The above-mentioned object can be achieved by a method of providing performance index information of a machine element by using a computer, according to the invention, the method comprising:

receiving a designation number of the machine element;

exhibiting a plurality of performance index candidates which are calculable for the machine element of the received designation number to request selection of performance indexes which are to be calculated;

exhibiting service conditions for the machine element of the received designation number which are necessary for calculating the selected performance indexes to request input of service condition data;

extracting dimension and element value data for the machine element of the received designation number from a database;

calculating a performance index value with respect to each of the selected performance indexes by using the input service condition data and the extracted dimension and element value data; and displaying simultaneously the calculated performance index values.

The selection input of the designation number of the machine element may be performed by any one of: a direct input of a data of the machine element designation number; selection from a catalog of machine elements; and selection from candidate designation numbers based on dimension information.

The computer includes a server connected to a network, requests a terminal connected to the network to input necessary data, and outputs a calculation result of a performance index.

The above-mentioned object can be also achieved by a method of supporting selection of a machine element by using a computer, according to the invention, the method comprising:

receiving data of a kind of machine element and service conditions, and an allowable value of a performance index of the machine element;

extracting dimension and element value data for a plurality of designation numbers of the received kind of machine element from a database;

calculating a performance index value with respect to the performance index on which the allowable value has been received by using the received service condition data and the extracted dimension and element value data; and comparing the calculated performance index value with the allowable value; and displaying a list of designation number of which the calculated performance index value satisfies the allowable value as a candidate.

Furthermore, electronic data including CAD data of the candidate are output.

In the display of candidate, also the calculated performance index value is displayed together.

Moreover, with respect to the machine element of the selected designation number in the displayed candidates, principal dimensions are extracted from the dimension and element value database, and then displayed.

The computer includes a server connected to a network, requests a terminal connected to the network to input necessary data, and outputs information for selection support.

Further, the above-mentioned object can be achieved by a system for providing performance index information of a machine element, according to the invention, the system comprising:

an input section for inputting a designation number of the machine element;

a display section;

a database which stores dimensions and element value for machine elements; and a calculation and control section which receives the designation number of the machine element input from the input section, exhibits a plurality of performance index candidates which are calculable for the machine element of the received designation number to request selection of one of a plurality of performance indexes which are to be calculated, exhibits service conditions for the machine element of the received designation number which are necessary for calculating the selected performance indexes to request input of service condition data, extracts dimension and element value data for the machine element of the received designation number from the database, calculates a performance index value with respect to each of the selected performance indexes by using the input service condition data and the extracted dimension and element value data, and displays simultaneously the calculated performance index values on the display section.

The selection input of the designation number of the machine element may be performed by any one of: a direct input of a data of the machine element designation number; selection from a catalog of machine elements; and selection from candidate designation numbers based on dimension information.

The calculation and control section is disposed in a server connected to a network, and the input section and the display section are disposed in a terminal connected to the network.

The above-mentioned object can be also achieved by a system for supporting selection of a machine element, according to the invention, the system comprising:

an input section for inputting data of a kind of machine element and service conditions, and an allowable value of a performance index of the machine element;

a display section;

a database which stores dimensions and element value for machine elements; and a calculation and control section which receives data of the kind of machine element and service conditions, and the allowable value of the performance index of the machine element input from the input section, extracts dimension and element value data for a plurality of designation numbers of the received kind of machine element from the database, calculates a performance index value with respect to the performance index on which the allowable value has been received by using the received service condition data and the extracted dimension and element value data, compares the calculated performance index value with the allowable value, and displays a list of designation number of which the calculated performance index value satisfies the allowable value as a candidate on the display section.

In the display of candidate on the display section, also the calculated performance index value is displayed together.

With respect to the machine element of the designation number which is selected through the input section from the displayed candidates, the calculation and control section extracts principal dimensions from the dimension and element value database, and then displays the extracted principal dimensions on the display section.

The calculation and control section is disposed in a server connected to a network, and the input section and the display section are disposed in a terminal connected to the network.

Further, the above-mentioned object can be achieved by a server for providing performance index information of a machine element, according to the invention, which is connected to a network, the server comprising:

a calculation and control section, which is accessible to a database which stores dimensions and element value for machine elements, and which receives a designation number of the machine element input from a terminal connected to the network, exhibits a plurality of performance index candidates which are calculable for the machine element of the received designation number to request selection of performance indexes which are to be calculated, exhibits service conditions for the machine element of the received designation number which are necessary for calculating the performance indexes that are selected by the input from the terminal to request input of service condition data, extracts dimension and element value data of the machine element of the received designation number from the database, calculates a performance index value with respect to each of the selected performance indexes by using the service condition data which is input from the terminal and the extracted dimension and element value data, and transmits simultaneously the calculated performance index values to the terminal.

The selection input of the designation number of the machine element may be performed by any one of: a direct input of a data of the machine element designation number; selection from a catalog of machine elements; and selection from candidate designation numbers based on dimension information.

The above-mentioned object can be also achieved by a server for supporting selection of a machine element, according to the invention, which is connected to a network, the server comprising:

a calculation and control section which is accessible to a database which stores dimension and element value for machine elements, and receives data of a kind of machine element and service conditions, and an allowable value of a performance index of the machine element input from a terminal connected to the network, extracts dimension and element value data for a plurality of designation numbers of the received kind of machine element from the database, calculates a performance index value with respect to the performance index on which the allowable value has been received by using the received service condition data and the extracted dimension and element value data, compares the calculated performance index value with the allowable value, and outputs a list of designation number of which the calculated performance index value satisfies the allowable value as a candidate to the terminal.

In the display of candidates on the display section, also the calculated performance index value is displayed together.

With respect to the machine element of the designation number which is selected through the input section from the displayed candidates, the calculation and control section extracts principal dimensions from the dimension and element value database, and then displays the extracted principal dimensions on the display section.

DETAILED DESCRIPTION OF THE PREFERRED EMBODIMENT (First Embodiment)

Hereinafter, embodiments of the invention will be described with reference to FIGS. 1 to 10. A first embodiment calculates and outputs a performance index value under designated service conditions, with respect to one or plural designated performance indexes of a machine element of a specific designation number.

Figure 1:
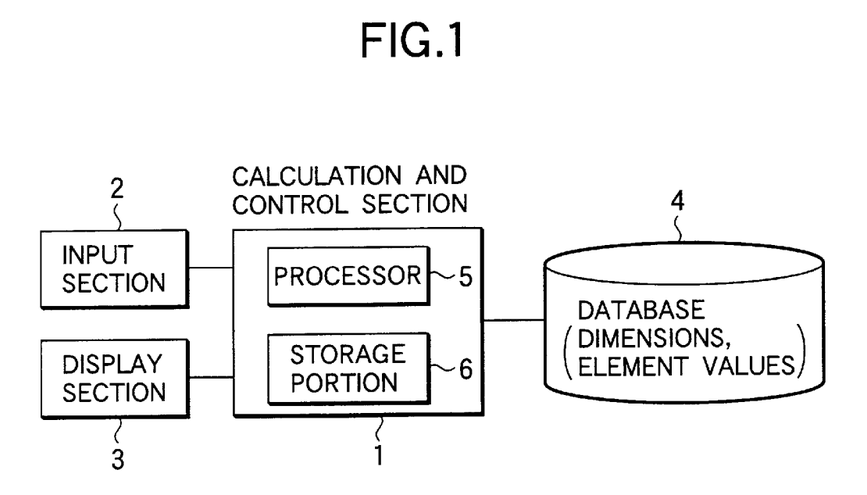
FIG. 1 is a schematic functional block diagram of the system of the invention.

FIG. 1 is a schematic functional block diagram of the system of the invention. The system of FIG. 1 has a calculation and control section 1, an input section 2, a display section 3, and a database 4. The input section 2 is used for inputting information required for operating the system. The input section 2 may be configured by a keyboard, a mouse, and the like. The display section 3 displays information for supporting various data inputs from the input section 2. The display section 3 also displays performance index values of machine elements which are obtained by the system. The calculation and control section 1 controls the operation of the whole system, and calculates a designated performance index value of a designated machine element. The calculation and control section 1 is configured mainly by a storage portion 6 and a processor 5 which implements programs stored in the storage portion 6. The storage portion 6 stores at least an information provision program for controlling the whole process of providing performance index information, various data which are necessary for implementing the information provision program, and plural performance calculation programs for calculating plural performance indexes of the machine element. The database 4 holds at least dimension data and element value data of the machine element from which performance indexes can be calculated. The dimension data and the element value data may be configured as a single database or separate databases. The element value data are various data which are not described in a catalog of a machine element. In a cylindrical roller bearing, for example, such data include the diameter of the pitch circle, the diameter of each roller, the number of rollers, the effective contact length, etc.

In the case where the system is configured by using a stand-alone computer, preferably, the database 4, and the information provision program, the various data, and the performance calculation programs which are to be stored in the storage portion 6 are provided in the form of a recording medium such as a CD-ROM, and the information provision program, the various data, and the performance calculation programs are then stored into the storage portion 6.

In the case where the performance information provision system is configured by using a network, a server connected to the network is provided with the function of the calculation and control section 1, a database is disposed in the server or in another computer which can be accessed by the server, and the input section 2 and the display section 3 are realized by input means and display means of a terminal connected to the network, respectively.

Figure 2:
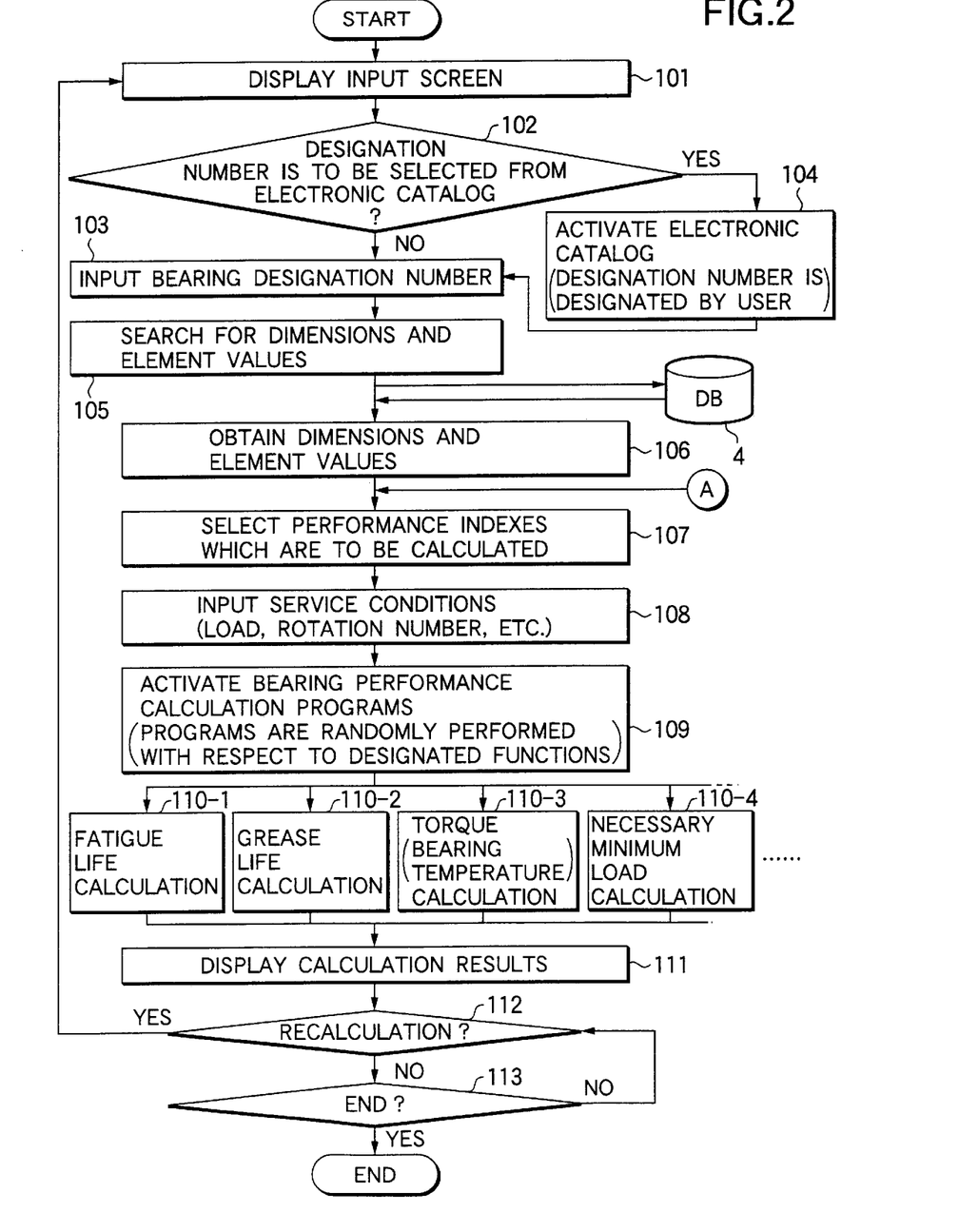
FIG. 2 is a chart showing the operation flow of a first embodiment.

FIG. 2 shows the operation flow in the case where a performance index value of the machine element is calculated by using the system of FIG. 1. In this example, description is made assuming that the machine element is a bearing and a stand-alone computer is used.

Figure 3:
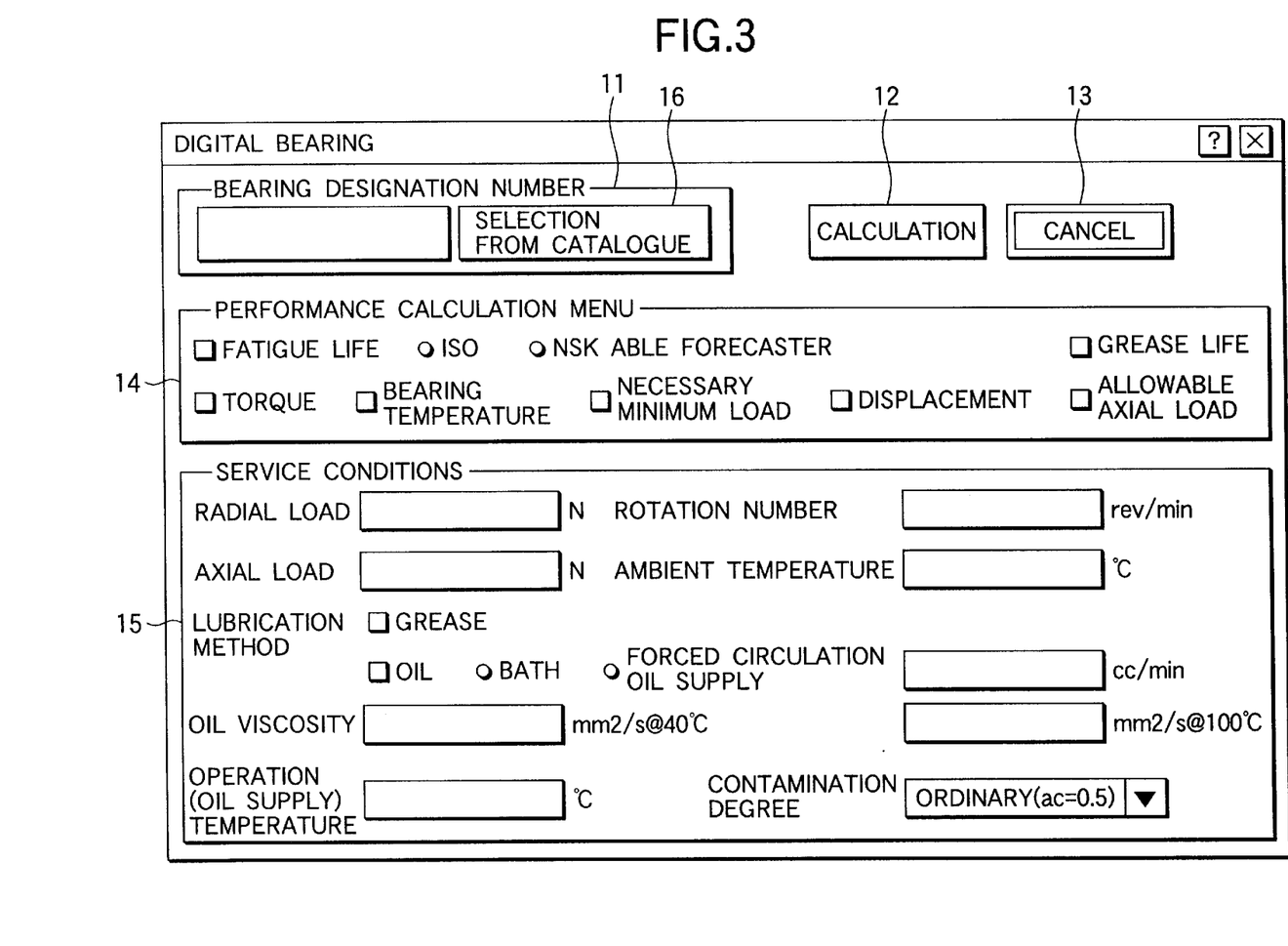
FIG. 3 shows an example of the configuration of a screen for inputting conditions of calculating performance indexes.

The system for providing performance index information of the machine element is activated, and the information provision program is implemented, so that an input screen is displayed on the display section 3 (step 101). As shown in FIG. 3, the input screen has a bearing designation number input area 11, a calculation button 12, a cancel button 13, a performance calculation menu area 14, and a service condition input area 15. At the time when the system is activated, only the bearing designation number input area 11 and the cancel button 13 are input-capable.

When calculation of a performance index of a specific bearing is to be performed, the designation number of the bearing is input to the bearing designation number input area 11. The designation number may be directly input through the keyboard. The designation number also may be judged whether a catalog selection button 16 is pressed or not (step 102), and, if the button is pressed, an electronic catalog may be activated to display a catalog so that a specific designation number is selected and input (step 103). The electronic catalog may be previously stored in the database 4, or the catalog and the dimension database may share data. When the designation number is input, the dimension and element value database 4 is searched (step 105) to obtain the dimensions and element values of the bearing of the input designation number (step 106).

At this time, in the input screen, the performance calculation menu area 14 is input-capable so that one or plural bearing performance indexes can be selected (step 107). In the case where selectable performance indexes are varied depending on the bearing designation number, a display screen is configured so that only selectable indexes can be input. In the case where plural calculation methods are selectable, such as index "fatigue life" shown in the figure, only when "fatigue life" is selected, inferior indexes such as "ISO" are selectable.

Figure 5:
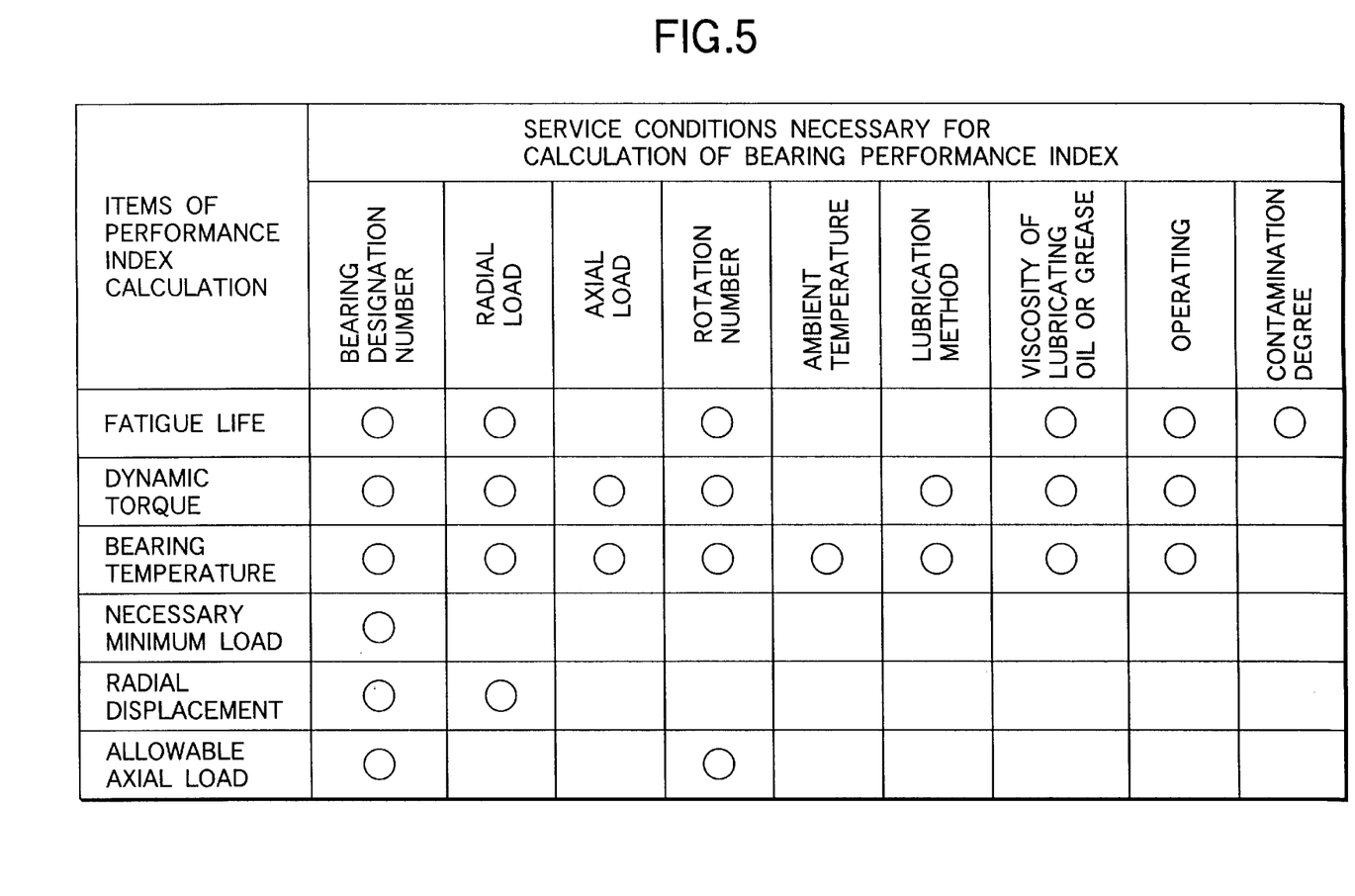
FIG. 5 is a table showing performance index items and service conditions which are necessary for calculating performance indexes.

When one or plural bearing performance indexes are selected, the service condition input area 15 of the selected bearing becomes input-capable. The necessary service conditions are varied depending on the bearing performance indexes and the designation number of the designated bearing. Therefore, only the service conditions which are necessary for calculating the selected performance indexes with respect to the designated designation number become input-capable. The service condition areas which are set to be input-capable are decided with reference to a table such as shown in FIG. 5. The table of in FIG. 5 shows an example in the case of a cylindrical roller bearing, and indicates that the radial load, the rotation number, the viscosity of the lubricating oil or grease, the operating temperature, and the contamination degree of the lubricating member are necessary in, for example, calculation of new life calculation expression "fatigue life".

Figure 6:
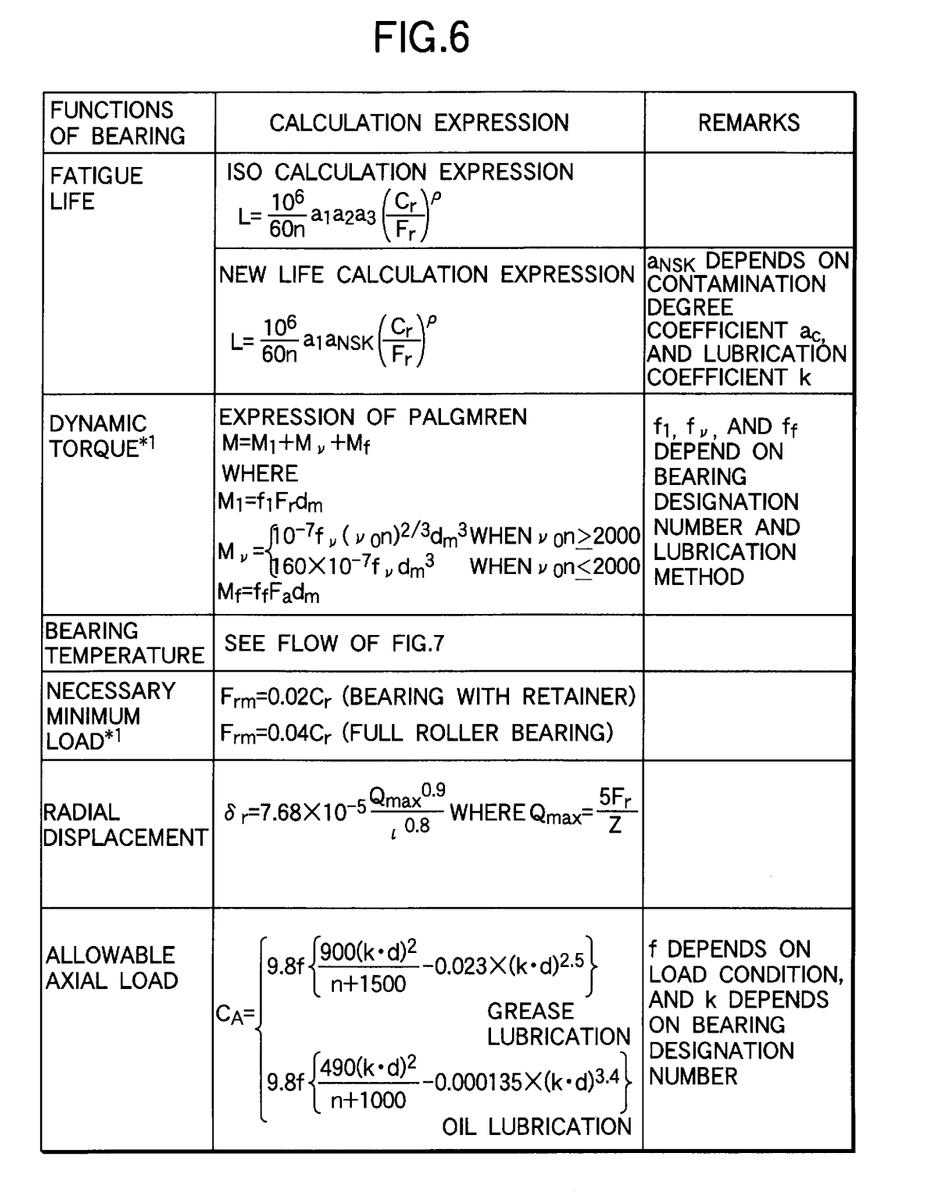
FIG. 6 is a table showing examples of calculation expressions which are used in performance index calculation programs.
Figure 7:
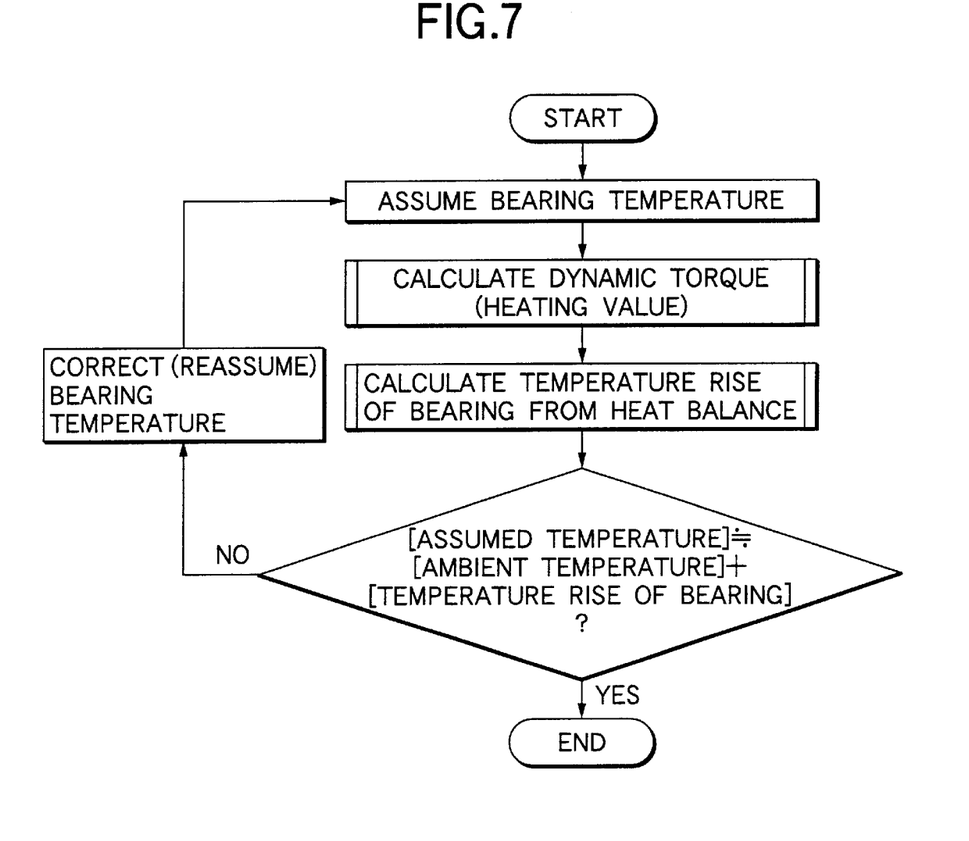
FIG. 7 is a chart showing an example of a procedure of calculating the bearing temperature.

When the necessary service conditions are input (step 108) and the calculation button 12 is then pressed, required performance calculation programs are activated. In this activation, necessary dimension and element value data and service condition data are given to the performance calculation programs. As the necessary dimension and element value data, necessary ones of the dimensions and element values which have been obtained in step 106 are used. Alternatively, a procedure of obtaining the necessary dimension and element value data from the database 4 may be performed before step 109. In the case where the bearing is a cylindrical roller bearing, for example, the performance calculation programs calculate performance indexes by the calculation expressions shown in FIG. 6, or the bearing temperature as a performance index by the procedure shown in FIG. 7. The calculation expressions shown in FIG. 6 are respectively disclose in documents as follows:

1) ISO life calculation expression

NSK Rolling Bearing General Catalog (CAT. No. 1101C), 1996, pp. A24–A27

2) New life calculation expression

SAE Technical Paper Series 2000-01-2601

3) Dynamic torque

T. A. Harris, "Rolling Bearing Analysis" ($3^{rd}$ Edition), John Wiley & Sons, 1991, pp. 540–510

4) Necessary minimum load

J. Brandlein, P. Eschmann, L. Hasbargen, and K. Weigand, translated by Tatsuo Yoshitake, supervised by Junzo Okamoto, "Practical Handbook of Rolling Bearings", KOGYO CHOSAKAI, 1996, p. 278

5) Radial displacement

Pages 328 and 199 of the book of 3)

6) Allowable axial load

Page A33 of the catalog of 1)

In place of the calculation expressions shown in FIG. 6, a program which has been developed by a bearing manufacturer (NSK Technical Journal (No. 663, 1997, pp. 1–7, or SAE Technical Paper 970586) may be used for obtaining a dynamic torque.

Figure 4:
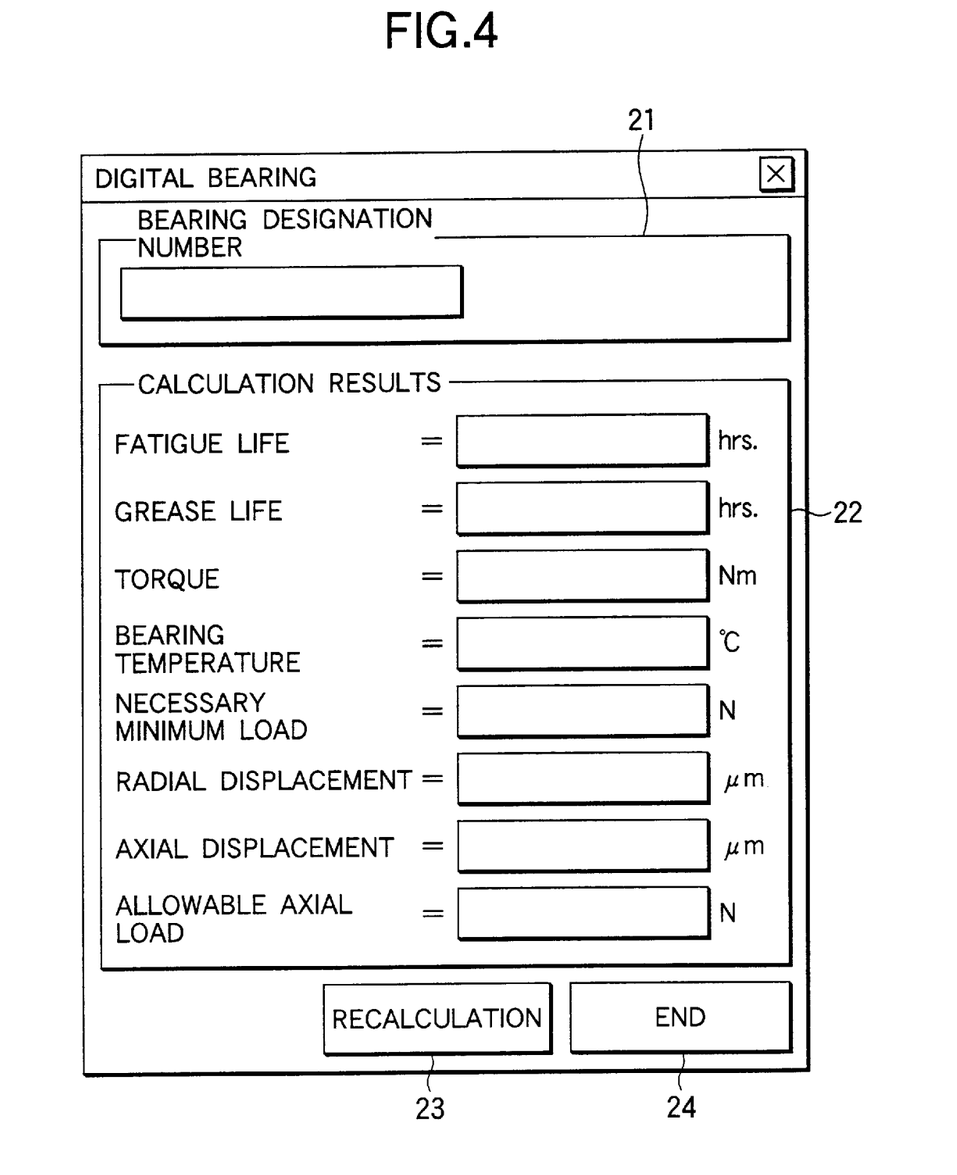
FIG. 4 shows an example of the configuration of a screen for displaying results of calculation of performance indexes.

The selected ones of the performance calculation programs 110-1, 110-2, 110-3, 110-4, . . . are randomly implemented. When all of the calculations are ended, the control returns to the information provision program to display results of the calculations in the form of a screen such as shown in FIG. 4 (step 111). The display screen of FIG. 4 has a bearing designation number display area 21, a performance calculation result display area 22, a recalculation button 23, and an end button 24. In the bearing designation number display area 21, the designation number which has been input in step 103 is displayed. In the performance calculation result display area 22, calculation results of only the performance indexes which have been selected in step 107 are displayed.

When the performance index calculation is to be further continued, the recalculation button 23 is pressed (the pressing is judged in step 112), and the control returns to step 101 to perform a similar process. When the performance calculating process is to be ended, the end button 24 is pressed (the pressing is judged in step 113), and the calculating process is ended.

As described above, in the first embodiment, plural performance indexes of a selected specific bearing can be simultaneously displayed. Therefore, a bearing can be easily selected, and a machine design can be rapidly performed.

(Second Embodiment)

Figure 8:
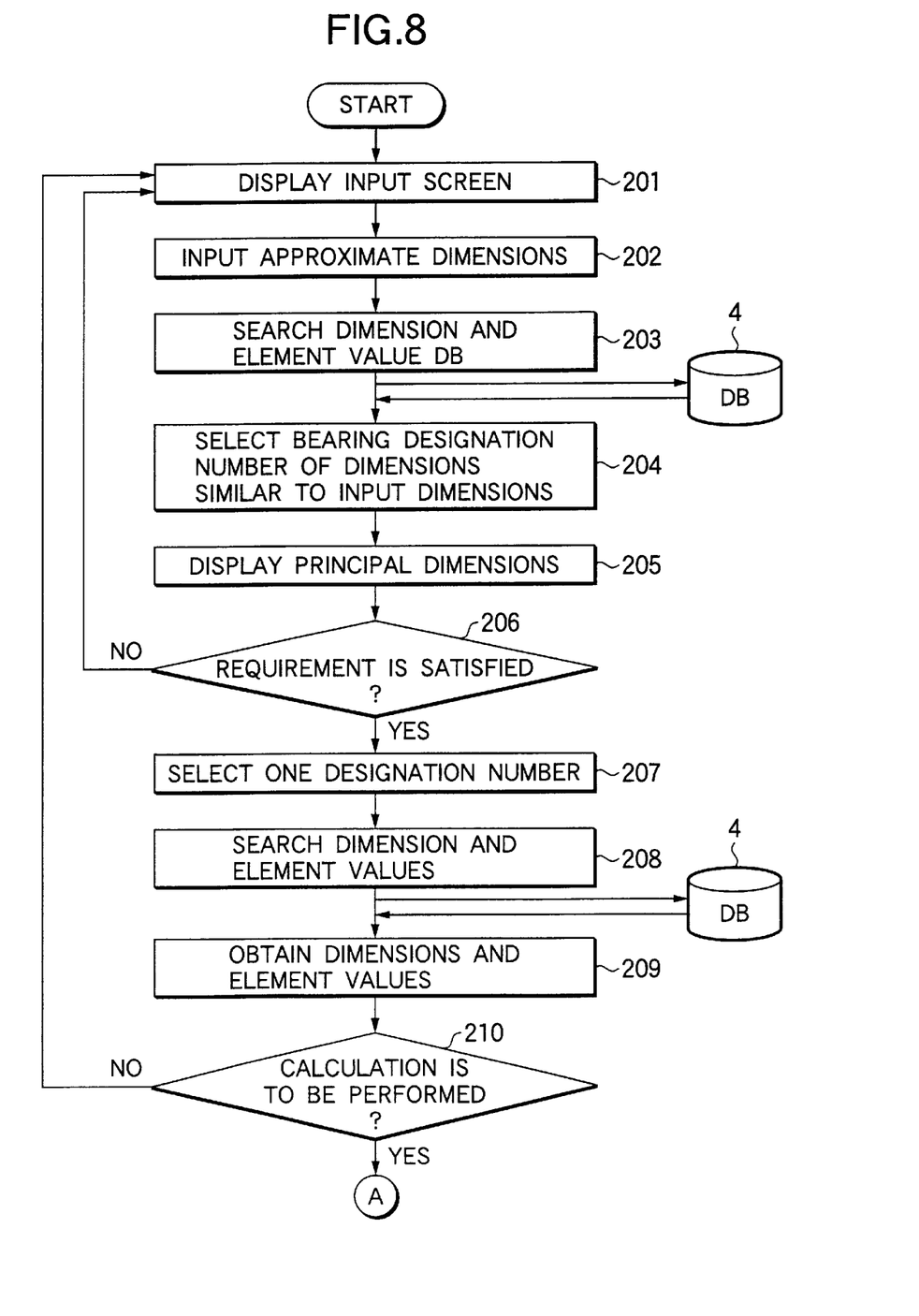
FIG. 8 is a chart showing the operation flow of a second embodiment.

A second embodiment is configured in a substantially same manner as the embodiment described above, except that the designation number of a bearing is selected in a different manner or in each information provision program the designation number is selected by a different procedure. FIG. 8 shows the operation flow in the case where a performance index value is calculated.

The system for providing performance index information of a machine element is activated, and the information provision program is implemented, so that an input screen is displayed on the display section 3 (step 201). The input screen is substantially identical with that shown in FIG. 3, and further has a dimension input area (not shown) for inputting approximate dimensions of a bearing.

When approximate dimensions are input to the dimension input area, the dimension and element value database 4 is searched (step 203) to select a bearing designation number of dimensions similar to the input dimensions (step 204), and obtain information of the principal dimensions from the database 4 to display the information on the display section 3 (step 205). If the displayed dimensions satisfy the requirement (this is judged in step 206), one bearing designation number is selected by pressing a predetermined button (step 207). If the displayed dimensions fail to satisfy the requirement, the control returns to step 201 to repeat the process in a similar manner.

When the designation number is selected, the dimension and element value database 4 is searched (step 208) to obtain the dimensions and element values of the selected designation number (step 209). When the performance index calculating process is to be further continued (this is judged in step 210), the control returns to step 107 of FIG. 2 to perform a process similar to that of the first embodiment.

As described above, in the second embodiment, a specific bearing can be easily selected on the basis of approximate dimensions.

(Third Embodiment)

In a third embodiment, when the bearing kind, dimension data, service conditions, and allowable performance index values are input, a bearing which satisfies the input conditions is automatically extracted. The storage portion 6 of the calculation and control section 1 shown in FIG. 1 stores a machine element selection support program, and various data which are necessary for implementing the machine element selection support program, in place of the information provision program for controlling the whole process of providing performance index information.

Figure 9:
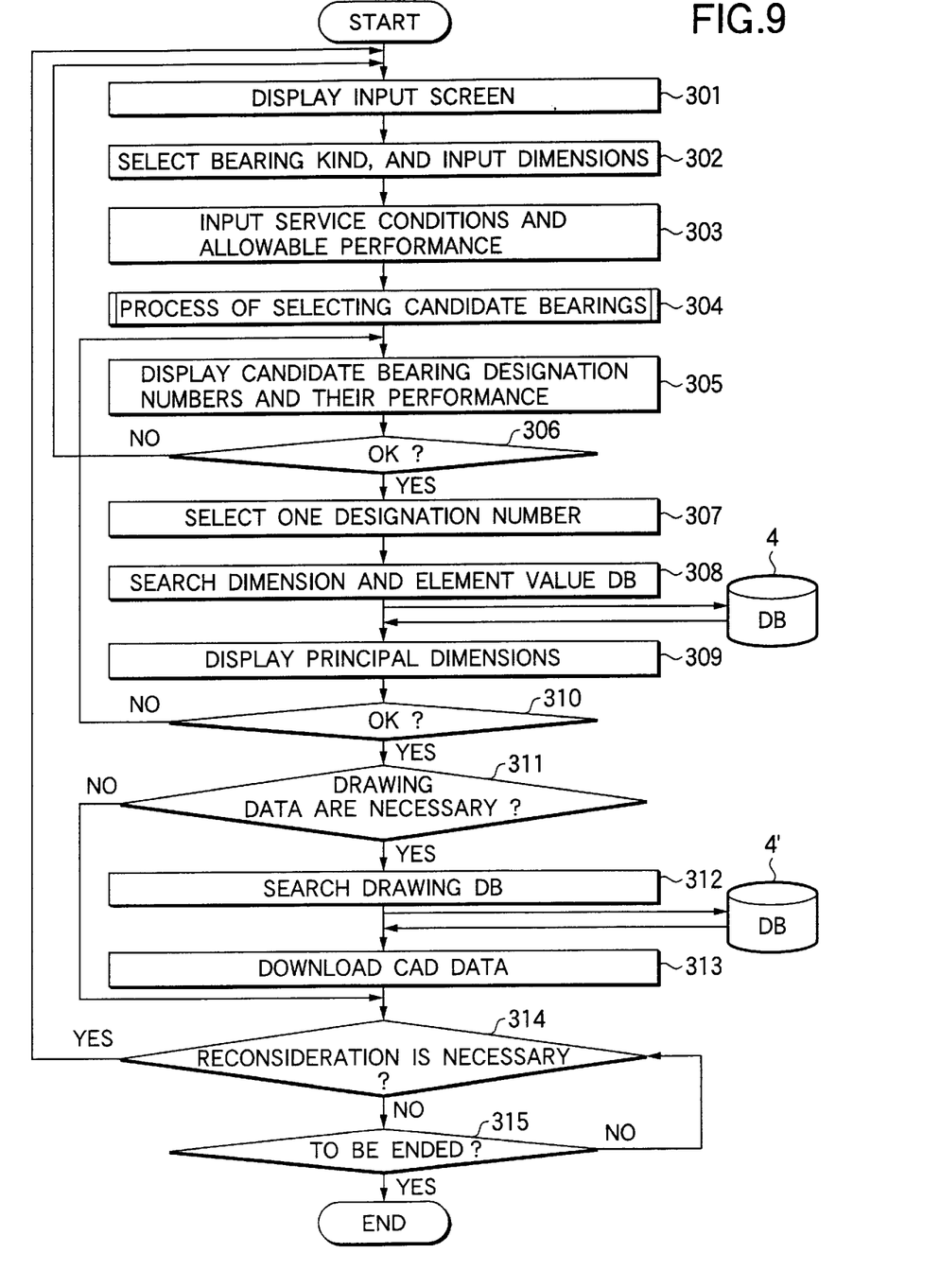
FIG. 9 is a chart showing the operation flow of a third embodiment.
Figure 10:
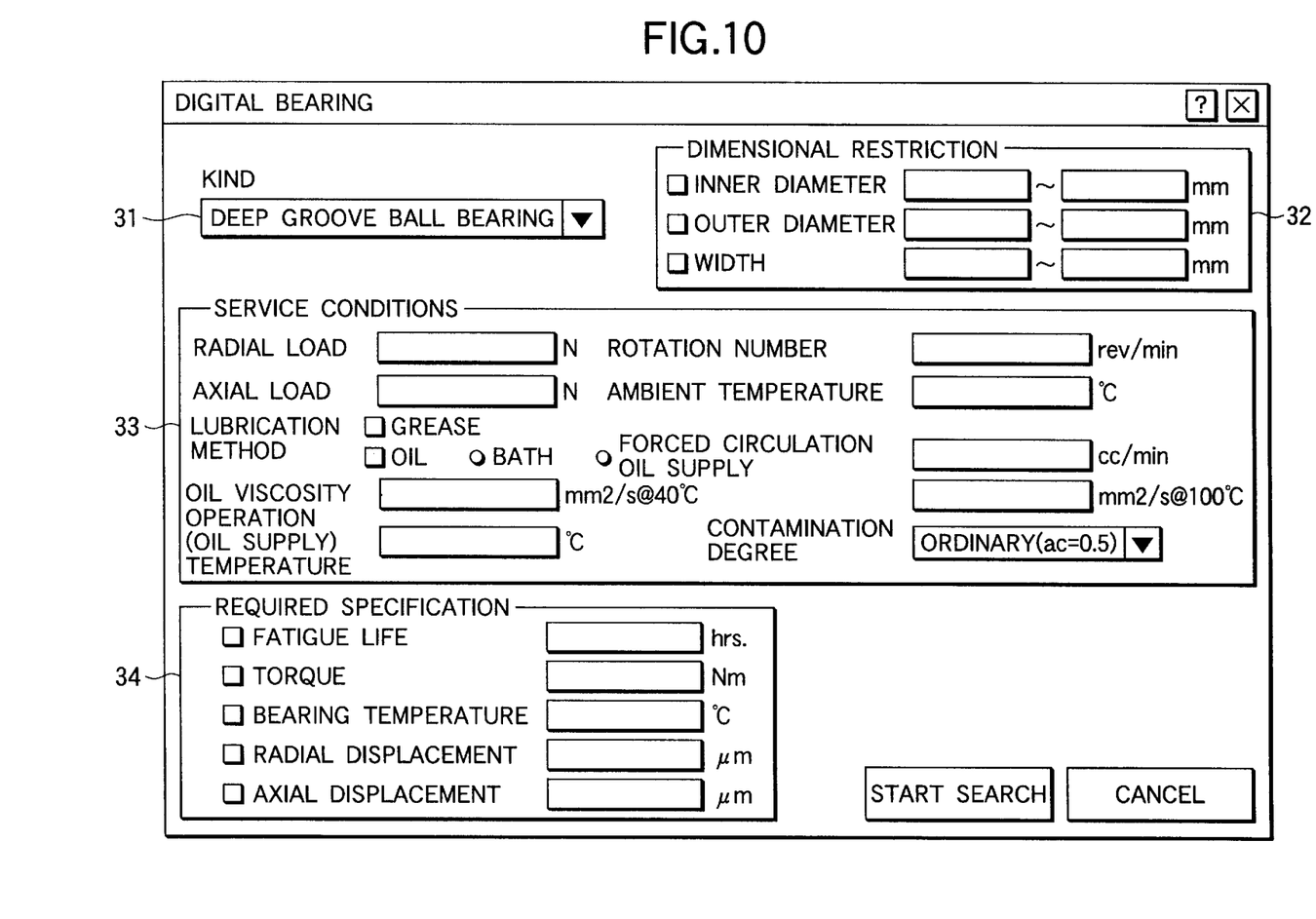
FIG. 10 shows an example of the configuration of a screen for inputting conditions of selecting a machine element.

FIG. 9 shows the operation flow in the case where selection of a bearing is supported. A system for supporting selection of the machine element is activated, and the machine element selection support program is implemented, so that an input screen is displayed on the display section 3 (step 301). As shown in FIG. 10, the input screen has a bearing kind input area 31, a dimension data input area 32, a service condition input area 33, and an allowable performance index input area 34. By using the input screen, the bearing kind and dimensions are input (step 302), and the service conditions of a bearing and allowable performance index values are input (step 303). Then, a process of selecting candidate bearings is implemented (304).

In the process of selecting candidate bearings, the dimension database is searched on the basis of the input dimension data to select one or plural candidate bearing designation numbers (by a process similar to that of steps 202 and 203 of FIG. 8), dimension and element value data are obtained for each of the candidate bearings, and one or plural performance indexes with respect to which allowable performance index values have been input are calculated. This calculation can be realized by programs which perform processes similar to those of steps 109, 110-1, . . . of FIG. 2. The combination of the obtained performance indexes is compared with the data which have been input to the allowable performance index input area 34, to extract bearings of the performance index which satisfies the data input to the allowable performance index input area 34. Alternatively, typical performance indexes of bearings in the database may be previously selected, the selected performance indexes may be stored in the database 4, and the candidate selecting process 304 may be realized by searching the database.

The extracted bearing designation numbers and the performance indexes of the bearings are displayed as selected candidate bearings on the display section 3 (step 305). If there is a selectable bearing in the displayed bearings (this is judged in step 306), one of the designation numbers is selected (step 307). If there is not a selectable bearing in the displayed bearings, the process is repeated in a similar manner.

When a bearing is selected from the candidate bearings, the database 4 is searched to display principal dimensions. If the displayed dimensions are not selectable, the control returns to step 305 to again display candidate bearings. If the displayed dimension data are selectable, the control proceeds to a process of downloading CAD data. As the CAD data, two- or three-dimensional CAD data corresponding to various CAD software applications may be selected.

In step 311, it is checked whether drawing data are necessary or not. If necessary, a drawing database is searched (step 312) to obtain CAD data. It is checked in step 314 whether reconsideration is necessary or not (314), and an ending process is performed (step 315).

In the case where the performance information provision system or the machine element selection support system is configured by using a network, the flow is fundamentally identical with that in the case where the system is configured by a stand-alone computer, except that a terminal accesses a server, input screen information which is sent from the server to the terminal is displayed on a display device of the terminal, and input data are sent to the server via the network.

As apparent from the above description, according to the invention, plural index values indicating the performance of a machine element can be simultaneously obtained, and a design can be rapidly performed. Furthermore, a machine element satisfying allowable values of plural performance indexes can be rapidly selected.

What is claimed is:

1. A method for providing performance index information of a machine element, the method comprising:
   receiving a designation number of the machine element;
   exhibiting a plurality of performance index candidates which are calculable for the machine element of the received designation number to request selection of performance indexes which are to be calculated;
   exhibiting service conditions for the machine element of the received designation number which are necessary for calculating the selected performance indexes to request input of service condition data;
   extracting dimension and element value data for the machine element of the received designation number from a database;
   calculating a performance index value with respect to each of the selected performance indexes by using the input service condition data and the extracted dimension and element value data; and
   displaying simultaneously the calculated performance index values.

2. A method for supporting selection of a machine element, the method comprising:
   receiving data of a kind of machine element and service conditions, and an allowable value of a performance index of the machine element;
   extracting dimension and element value data for a plurality of designation numbers of the received kind of machine element from a database;
   calculating a performance index value with respect to the performance index on which the allowable value has been received by using the received service condition data and the extracted dimension and element value data;
   comparing the calculated performance index value with the allowable value; and
   displaying a list of designation number of which the calculated performance index value satisfies the allowable value as a candidate.

3. The method of supporting selection of the machine element according to claim 2, comprising:
   outputting electronic data including CAD data of the candidate.

4. The method of supporting selection of a machine element according to claim 2, wherein the calculated performance index value is displayed together with the candidate.

5. A recording medium wherein said medium stores a program for causing a computer to perform a procedure comprising:
   receiving data of a kind of machine element and service conditions, and an allowable value of a performance index of the machine element;
   extracting dimension and element value data for a plurality of designation numbers of the received kind of machine element from a database;
   calculating a performance index value with respect to the performance index on which the allowable value has been received by using the received service condition data and the extracted dimension and element value data;
   comparing the calculated performance index value with the allowable value;
   displaying a list of designation number of which the calculated performance index value satisfies the allowable value as a candidate; and
   outputting electronic data including CAD data of the candidate.

6. A recording medium wherein said medium stores a program for causing a computer to perform a procedure comprising:
   receiving a designation number of a machine element;
   exhibiting a plurality of performance index candidates which are calculable for the machine element of the received designation number to request selection of performance indexes which are to be calculated;
   exhibiting service conditions for the machine element of the received designation number which are necessary for calculating the selected performance indexes to request input of service condition data;
   extracting dimension and element value data for the machine element of the received designation number from a database;

calculating a performance index value with respect to each of the selected performance indexes by using the input service condition data and the extracted dimension and element value data; and displaying simultaneously the calculated performance index values.

7. A server for supporting selection of a machine element, which is connected to a network, the server comprising:

a calculation and control section which is accessible to a database which stores dimension and element value for machine elements, and receives data of a kind of machine element and service conditions, and an allowable value of a performance index of the machine element input from a terminal connected to the network, extracts dimension and element value data for a plurality of designation numbers of the received kind of machine element from the database, calculates a performance index value with respect to the performance index on which the allowable value has been received by using the received service condition data and the extracted dimension and element value data, compares the calculated performance index value with the allowable value, and outputs list of a designation number of which the calculated performance index value satisfies the allowable value as a candidate to the terminal.

8. A server for providing performance index information of a machine element, which is connected to a network, the server comprising:

a calculation and control section, which is accessible to a database which stores dimensions and element value for machine elements, and which receives a designation number of the machine element input from a terminal connected to the network, exhibits a plurality of performance index candidates which are calculable for the machine element of the received designation number to request selection of performance indexes which are to be calculated, exhibits service conditions for the machine element of the received designation number which are necessary for calculating the performance indexes that are selected by the input from the terminal to request input of service condition data, extracts dimension and element value data of the machine element of the received designation number from the database, calculates a performance index value with respect to each of the selected performance indexes by using the service condition data which is input from the terminal and the extracted dimension and element value data, and transmits simultaneously the calculated performance index values to the terminal.

9. A system for providing performance index information of a machine element, the system comprising:

an input section for inputting a designation number of the machine element;

a display section;

a database which stores dimensions and element value for machine elements; and a calculation and control section which receives the designation number of the machine element input from the input section, exhibits a plurality of performance index candidates which are calculable for the machine element of the received designation number to request selection of one or a plurality of performance indexes which are to be calculated, exhibits service conditions for the machine element of the received designation number which are necessary for calculating the selected performance indexes to request input of service condition data, extracts dimension and element value data for the machine element of the received designation number from the database, calculates a performance index value with respect to each of the selected performance indexes by using the input service condition data and the extracted dimension and element value data, and displays simultaneously the calculated performance index values on the display section.

10. The system for providing performance index information of the machine element according to claim 9, wherein the input of the designation number of the machine element is performed by one of: a direct input of a data of the machine element designation number; selection from a catalog of machine elements; and selection from candidate designation numbers based on dimension information.

11. A system for supporting selection of a machine element, the system comprising:

an input section for inputting data of a kind of machine element and service conditions, and an allowable value of a performance index of the machine element;

a display section;

a database which stores dimensions and element value for machine elements; and a calculation and control section which receives data of the kind of machine element and service conditions, and the allowable value of the performance index of the machine element input from the input section, extracts dimension and element value data for a plurality of designation numbers of the received kind of machine element from the database, calculates a performance index value with respect to the performance index on which the allowable value has been received by using the received service condition data and the extracted dimension and element value data, compares the calculated performance index value with the allowable value, and displays a list of designation number of which the calculated performance index value satisfies the allowable value as a candidate on the display section.

12. The system for supporting selection of the machine element according to claim 11, wherein the calculation and control section outputs electronic data including CAD data of the candidate.

13. The system for supporting selection of the machine element according to claim 11, wherein the calculated performance index value is displayed together with the candidate on the display section.

* * * * *